UNITED STATES PATENT OFFICE.

ARTHUR ZART, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

BLUISH-VIOLET DISAZO DYE.

1,012,960.  Specification of Letters Patent.  Patented Dec. 26, 1911.

No Drawing.  Application filed September 1, 1911. Serial No. 647,254.

*To all whom it may concern:*

Be it known that I, ARTHUR ZART, doctor of philosophy, chemist, citizen of the German Empire, residing at Vohwinkel, near Elberfeld, Germany, have invented new and useful Improvements in Bluish-Violet Disazo Dye, of which the following is a specification.

The present invention relates to the manufacture and production of a new disazo coloring matter capable of dyeing cotton in pure bluish-violet shades which are distinguished for their good fastness to ironing. The process for its production consists in combining 1 molecule of the tetrazo compound prepared from benzidin-ortho-ortho$_1$-disulfonic acid

with 2 molecules of the 5.5'-dioxy-2.2'-dinaphthylamin-7-7'-disulfonic acid

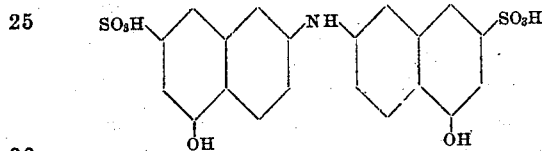

(See British Letters Patent No. 24296/99).

In order to illustrate the new process more fully the following example is given, the parts being by weight:—344 parts of benzidin-ortho-ortho$_1$-disulfonic acid are tetrazotized with 138 parts of sodium nitrite and hydrochloric acid and the tetrazo compound thus produced is combined with a solution of 922 parts of 5.5'-dioxy-2.2'-dinaphthylamin-7.7'-disulfonic acid containing an excess of sodium bicarbonate (NaHCO$_3$). The product of the reaction is heated to about 60° C. and the new dye is precipitated by the addition of common salt, filtered off and dried. It is a dark powder soluble in water with a violet coloration and soluble in concentrated sulfuric acid with a blue coloration, yielding upon reduction with stannous chlorid and hydrochloric acid benzidin-ortho-ortho$_1$-disulfonic acid and 5.5'-dioxy-6-amino-2.2'-dinaphthylamin-7.7'-disulfonic acid; and dyeing cotton bluish-violet shades fast to ironing.

I claim:—

The herein described disazo dye having most probably the formula:

which is after being dried and pulverized in the shape of its sodium salt a dark powder soluble in water with a violet coloration and being soluble in concentrated sulfuric acid with a blue coloration; yielding upon reduction with stannous chlorid and hydrochloric acid 5.5'-dioxy-6-amino-2.2'-dinaphthylamin-7.7'-disulfonic acid and benzidin-ortho-ortho$_1$-disulfonic acid; and dyeing cotton bluish-violet shades fast to ironing, substantially as described.

In testimony whereof I have hereunto set my hand in the presence of two subscribing witnesses.

ARTHUR ZART. [L. S.]

Witnesses:
 CHAS. J. WRIGHT,
 L. NUFER.